(12) United States Patent
Kamei et al.

(10) Patent No.: US 9,170,597 B2
(45) Date of Patent: Oct. 27, 2015

(54) INRUSH CURRENT SUPPRESSING DEVICE

(75) Inventors: Kenji Kamei, Chiyoda-ku (JP); Sho Tokoyoda, Chiyoda-ku (JP); Tomohito Mori, Chiyoda-ku (JP); Hiroki Ito, Chiyoda-ku (JP); Sadayuki Kinoshita, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 114 days.

(21) Appl. No.: 13/877,756

(22) PCT Filed: Dec. 17, 2010

(86) PCT No.: PCT/JP2010/072816
§ 371 (c)(1),
(2), (4) Date: Apr. 4, 2013

(87) PCT Pub. No.: WO2012/081129
PCT Pub. Date: Jun. 21, 2012

(65) Prior Publication Data
US 2013/0193946 A1    Aug. 1, 2013

(51) Int. Cl.
*H02H 9/02* (2006.01)
*G05F 5/00* (2006.01)
*H01H 33/59* (2006.01)
*H02H 9/00* (2006.01)

(52) U.S. Cl.
CPC ............... *G05F 5/00* (2013.01); *H01H 33/59* (2013.01); *H02H 9/002* (2013.01); *H02H 9/02* (2013.01)

(58) Field of Classification Search
CPC ........... H02H 9/002; H01H 9/563; G05F 1/12

USPC ........................... 323/355, 908, 209; 307/129
See application file for complete search history.

(56) References Cited

U.S. PATENT DOCUMENTS 7,982,341 B2    7/2011    Kinoshita et al.
8,217,536 B2    7/2012    Koshizuka et al.
(Continued)

FOREIGN PATENT DOCUMENTS

CN    101447664 A    6/2009
CN    101609983 A    12/2009
(Continued)

OTHER PUBLICATIONS

Mahgoub, O.A, "Microcontroller-based switch for three-phase transformer inrush current minimization," Power Electronics Congress, 1996. Technical Proceedings. CIEP '96., V IEEE International , vol., No., pp. 107,112, Oct. 14-17, 1996.*
(Continued)

*Primary Examiner* — Harry Behm
*Assistant Examiner* — Peter Novak
(74) *Attorney, Agent, or Firm* — Buchanan Ingersoll & Rooney PC

(57) ABSTRACT

An inrush current suppressing device includes a residual-magnetic-flux calculating unit configured to retain an interruption characteristic of a breaker and an attenuation characteristic of a magnetic flux that are estimated by measurement, analysis, or the like beforehand, and apply the attenuation characteristic to a magnetic flux value at the time of current interruption obtained based on the interruption characteristic of the breaker to calculate a residual magnetic flux value. The breaker is turned on in a power supply voltage phase in which the calculated residual magnetic flux value and a theoretical value of a steady magnetic flux match.

5 Claims, 4 Drawing Sheets

(56) References Cited

U.S. PATENT DOCUMENTS

| | | | |
|---|---|---|---|
| 2004/0124814 | A1 | 7/2004 | Tsutada et al. |
| 2006/0018068 | A1 | 1/2006 | Kinoshita et al. |
| 2009/0134862 | A1* | 5/2009 | Kinoshita et al. ............ 323/361 |
| 2010/0039737 | A1 | 2/2010 | Koshizuka et al. |
| 2010/0141235 | A1* | 6/2010 | Koshiduka et al. ........... 323/355 |

FOREIGN PATENT DOCUMENTS

| | | |
|---|---|---|
| JP | 2-179220 A | 7/1990 |
| JP | 11-353969 A | 12/1999 |
| JP | 2004-208394 A | 7/2004 |
| JP | 2006-040566 A | 2/2006 |
| JP | 2007-336712 A | 12/2007 |
| WO | WO 2008/065757 A1 | 6/2008 |
| WO | WO 2008065757 A1 * | 6/2008 |

OTHER PUBLICATIONS

Klopper, S.; Ferreira, J.A., "A sensor for balancing flux in converters with a high frequency transformer link," Industry Applications Society Annual Meeting, 1993., Conference Record of the 1993 IEEE, vol., No., pp. 1315,1320 vol. 2, Oct. 2-8, 1993.*

International Search Report (PCT/ISA/210) issued on Feb. 8, 2011, by the Japanese Patent Office as the International Searching Authority for International Application No. PCT/JP2010/072816.

Written Opinion (PCT/ISA/237) issued on Feb. 8, 2011, by the Japanese Patent Office as the International Searching Authority for International Application No. PCT/JP2010/072816.

Office Action from the Chinese Patent Office dated Oct. 21, 2014, issued in corresponding Chinese Patent Application No. 201080069827.8, with English translation of the Office Action. (11 pages).

Canadian Office Action dated Dec. 30, 2014 issued in corresponding Canadian Patent Appln. No. 2,815,464 (6 pages).

Chinese Office Action (Second) issued on Apr. 27, 2015, by the Chinese Patent Office in corresponding Chinese Patent Application No. 201080069827.8 and a partial English translation thereof. (14 pgs).

* cited by examiner

FIG.4

| MAGNETIC FLUX VALUE RATIO AT TIME OF CURRENT INTERRUPTION [%] | RESIDUAL MAGNETIC FLUX VALUE RATIO [%] |
|---|---|
| 100 | 80 |
| 90 | 72 |
| 80 | 64 |
| 70 | 56 |
| ⋮ | ⋮ |
| 0 | 0 |

US 9,170,597 B2

INRUSH CURRENT SUPPRESSING DEVICE

FIELD

The present invention relates to an inrush current suppressing device.

BACKGROUND

During excitation and turn-on of a no-load transformer, it is likely that, because of a magnetic saturation characteristic of a transformer core, an excitation inrush current several times larger than the rated current occurs to causes voltage fluctuations and unnecessary trips relays. To suppress the excitation inrush current, a breaker needs to be turned on in a voltage phase in which a residual magnetic flux remaining in the transformer core after interruption and a steady magnetic flux (an alternating magnetic flux generated when a rated voltage is applied to the transformer) match. For example, there is disclosed a technology for storing a phase of an alternating-current voltage at a time of breaker opening and adjusting output time of a breaker turn-on signal such that, at a time of the next turn-on, the breaker can be turned on in a phase same as the phase of the alternating-current voltage at the time of the breaker opening (e.g., Patent Literature 1).

CITATION LIST

Patent Literature

Patent Literature 1: Japanese Patent Application Laid-open No. 11-353969

SUMMARY

Technical Problem

The related art is based on a premise that a magnetic flux instantaneous value at the time of the breaker opening remains in the transformer core without change and does not change until the next turn-on. However, a residual magnetic flux attenuated from the magnetic flux instantaneous value at the time of breaker opening remains because of transformer core properties or capacitive elements charging/discharging in the transformer circuit Therefore, there is a problem in that, even if, at a time of the next turn-on, the transformer is turned on in a voltage phase same as a voltage phase at the time of the breaker opening, the residual magnetic flux and the steady magnetic flux do not match and the excitation inrush current cannot be sufficiently suppressed.

The present invention has been devised in view of the above and provides an inrush current suppressing device capable of suppressing an excitation inrush current that could occur due to mismatch of a residual flux and steady magnetic flux.

Solution to Problem

There is provided an inrush current suppressing device according to an aspect of the present invention applied to a configuration in which a breaker is connected between a power supply and a transformer, the inrush current suppressing device suppressing an excitation inrush current in the transformer associated with a closing operation, the inrush current suppressing device including: a power-supply-voltage measuring unit configured to measure a power supply voltage on a side of the power supply of the breaker; a residual-magnetic-flux calculating unit configured to retain an interruption characteristic in an opening process of the breaker and an attenuation characteristic of a magnetic flux of the transformer after current interruption, calculate a magnetic flux value at a time of current interruption based on the power supply voltage and the interruption characteristic, and calculate a residual magnetic flux value based on the magnetic flux value at the time of current interruption and the attenuation characteristic; a turn-on-phase calculating unit configured to calculate a power supply voltage phase where the residual magnetic flux value and a steady magnetic flux value at a time of application of the power supply voltage match and set the power supply voltage phase as a turn-on power supply voltage phase; and a control unit configured to control to close the breaker such that the breaker is turned on in the turn-on power supply voltage phase.

Advantageous Effects of Invention

According to the present invention, there is an effect that it is possible to suppress an excitation inrush current that could occur because of mismatch of a residual magnetic flux and a steady magnetic flux.

BRIEF DESCRIPTION OF DRAWINGS

FIG. 4 is a diagram of an example of a magnetic flux value conversion table according to a second embodiment.

DESCRIPTION OF EMBODIMENTS

An inrush current suppressing device according to an embodiment of the present invention is explained with reference to the accompanying drawings. The present invention is not limited by the embodiment explained below.

First Embodiment

Figure 1:
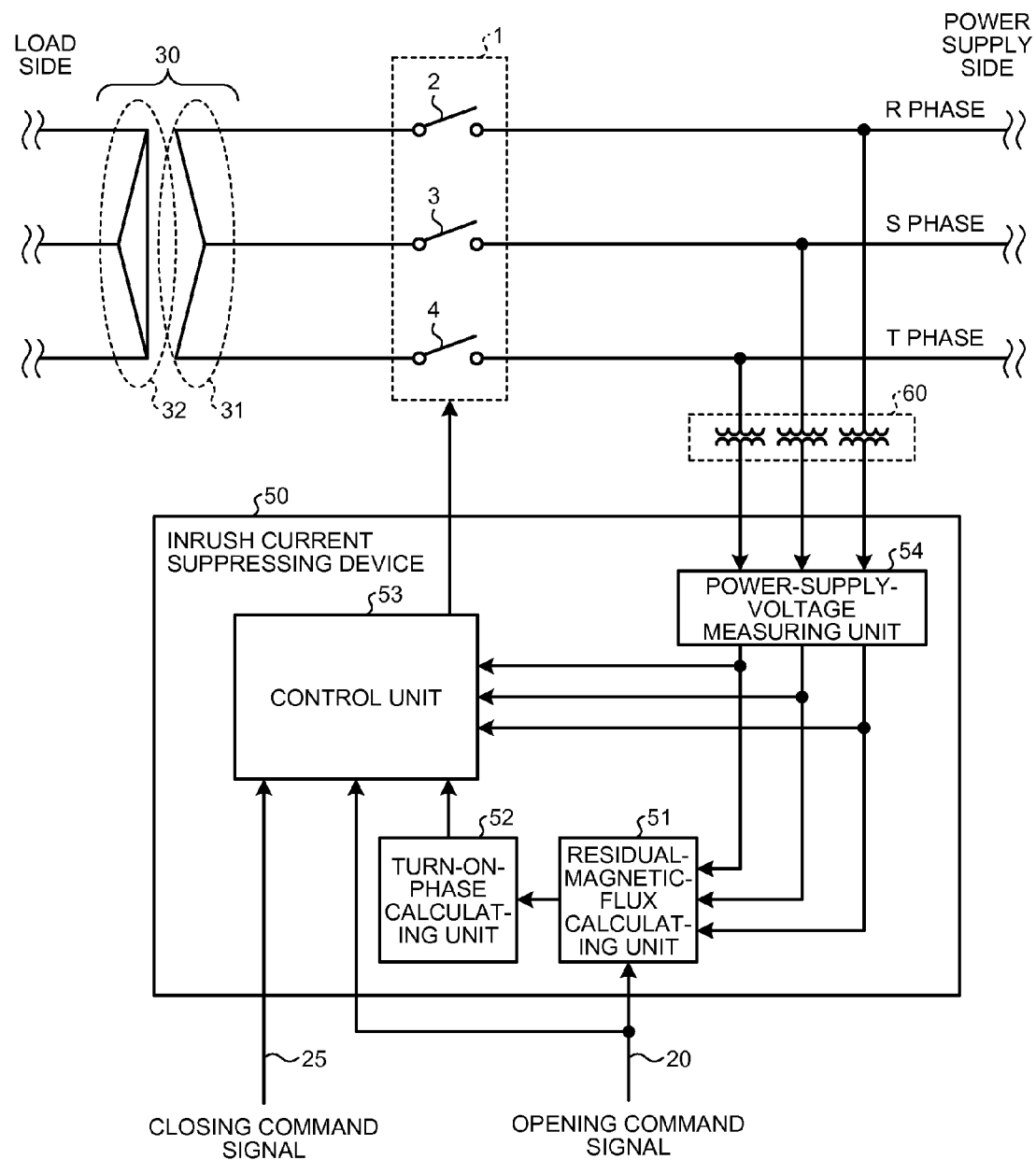
FIG. 1 is a diagram of an example of an inrush current suppressing device according to a first embodiment.

FIG. 1 is a diagram of an example of an inrush current suppressing device according to a first embodiment. In FIG. 1, a breaker 1 is connected between phase power supplies (not shown in the figure) including an R phase, an S phase, and a T phase on the right side in the figure and a transformer 30 on the left side in the figure. The breaker 1 includes switches 2, 3, and 4 respectively for the phases and can open and close the switches 2, 3, and 4 simultaneously or independently from one another. During a normal operation, the switches 2, 3, and 4 are closed and electric power is supplied to the transformer 30. For example, when some accident occurs or during maintenance or inspection, the switches 2, 3, and 4 are opened and the power supply to the transformer 30 is interrupted.

In an example shown in FIG. 1, the transformer 30 is a three-phase transformer connected by Y-Δ wire connection. Specifically, the transformer 30 includes a three-phase primary winding wire 31 connected in a star shape and opened in a neutral point and a three-phase secondary winding wire 32 connected in a triangular shape. Three input terminals of the three-phase primary winding wire 31 are respectively connected to the phase power supplies via the switches 2, 3, and 4. Three output terminals of the three-phase secondary winding wire 32 are connected to a load (not shown in the figure). A power-supply-voltage detecting unit 60 configured to detect phase power supply voltages is connected to power-supply-side terminals of the switches 2, 3, and 4. Detection signals are output to an inrush current suppressing device 50. Steady magnetic fluxes are generated in phases of the transformer 30 at the time of closing of the breaker 1. Residual magnetic fluxes are generated in the phases of the transformer 30 at the time of opening of the breaker 1.

The inrush current suppressing device 50 according to the first embodiment is configured by, for example, a computer. The inrush current suppressing device 50 includes a power-supply-voltage measuring unit 54, a residual-magnetic-flux calculating unit 51, a turn-on-phase calculating unit 52, and a control unit 53.

The power-supply-voltage measuring unit 54 continuously measures instantaneous values of the phase power supply voltages based on the detection signals from the power-supply-voltage detecting unit 60 and outputs the instantaneous values to the residual-magnetic-flux calculating unit 51 and the control unit 53. In the example shown in FIG. 1, the power-supply-voltage detecting unit 60 and the power-supply-voltage measuring unit 54 are respectively shown as different components and the inrush current suppressing device 50 is shown as not including the power-supply-voltage detecting unit 60. However, the power-supply-voltage detecting unit 60 can be included in the inrush current suppressing device 50. Further, the power-supply-voltage measuring unit 54 can be configured to have a function of the power-supply-voltage detecting unit 60.

The residual-magnetic-flux calculating unit 51 calculates a power supply voltage phase at a time of current interruption from input time of an opening command signal 20 and calculates a residual magnetic flux value from a magnetic flux value in the calculated power supply voltage phase. A method of calculating the residual magnetic flux value is explained below.

The turn-on-phase calculating unit 52 calculates a power supply voltage phase in which the residual magnetic flux calculated by the residual-magnetic-flux calculating unit 51 and a steady magnetic flux at a time of application of a power supply voltage match.

The control unit 53 controls to open the switches 2, 3, and 4 of the breaker 1 based on an opening command signal 20. The control unit 53 also controls to close the switches 2, 3, and 4 of the breaker 1 based on a closing command signal 25 such that the switches 2, 3, and 4 are turned on in the power supply voltage phase calculated by the turn-on-phase calculating unit 52.

Closing of the switches 2, 3, and 4 means mechanical contact of contacts of the switches 2, 3, and 4. A predetermined time from the closing control of the switches 2, 3, and 4 by the control unit 53 until actual closing of the switches 2, 3, and 4 is referred to as closing time. It is known that, in the breaker 1, an arc current starts to flow before the switches 2, 3, and 4 are closed (pre-arc). Turn-on of the switches 2, 3, 4 means feeding of the arc current by the pre-arc to the switches 2, 3, and 4. A predetermined time from the closing control of the switches 2, 3, and 4 by the control unit 53 until actual turn-on of the switches 2, 3, and 4 is referred to as turn-on time. The turn-on time depends on a rate of decrease of the dielectric strength (RDDS) characteristic in a closing process of the breaker 1.

On the other hand, opening of the switches 2, 3, and 4 means mechanical separation of the contacts of the switches 2, 3, and 4. A predetermined time from the opening control of the switches 2, 3, and 4 by the control unit 53 until actual opening of the switches 2, 3, and 4 is referred to as opening time. It is known that, in the breaker 1, the arc current flows for a predetermined time even if the switches 2, 3, and 4 are mechanically opened. Interruption of the switches 2, 3, and 4 means extinction of the arc current flowing to the switches 2, 3, and 4. A predetermined time from the opening control of the switches 2, 3, and 4 by the control unit 53 until actual current interruption for the switches 2, 3, and 4 is referred to as arc time. The arc time depends on a rate of rise of the dielectric strength (RRDS) characteristic in an opening process of the breaker 1.

Therefore, the control unit 53 performs the opening control and the closing control for the switches 2, 3, and 4 of the breaker 1 for each of the phases or individually for the phases taking into account the closing time, the turn-on time, the opening time, and the arc time.

Figure 2:
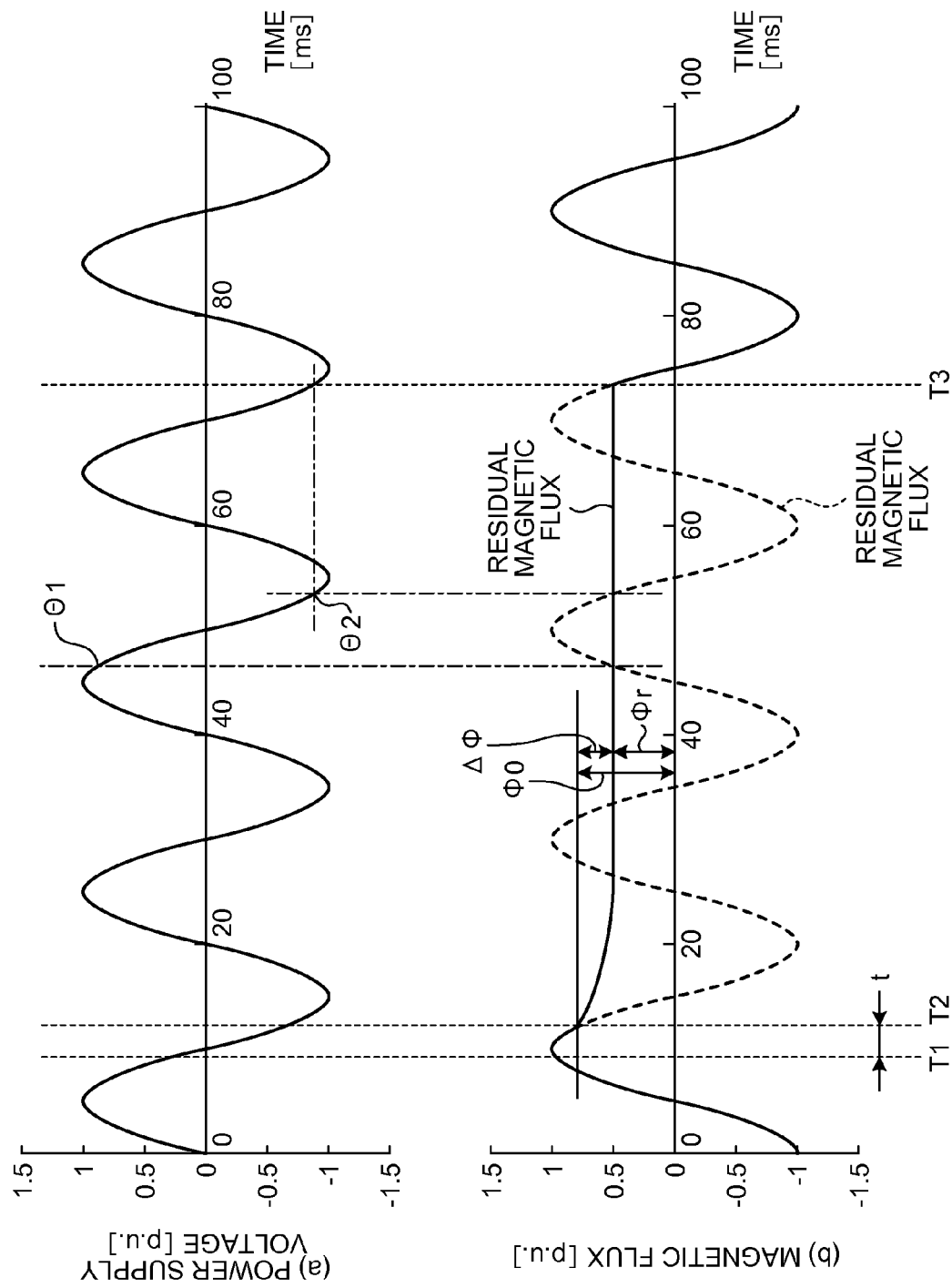
FIG. 2 is a diagram of an example of closing phase control in the inrush current suppressing device according to the first embodiment.

FIG. 2 is a diagram of an example of closing phase control in the inrush current suppressing device according to the first embodiment. FIG. 2(a) shows a power supply voltage waveform equivalent to one phase normalized with a maximum of a power supply voltage set to 1. FIG. 2(b) shows a magnetic flux waveform of a phase corresponding to FIG. 2(a) normalized with a maximum of a magnetic flux set to 1. A waveform indicated by a broken line in FIG. 2(b) indicates a theoretical value waveform of a steady magnetic flux at the time of application of the power supply voltage.

As shown in FIG. 2, in an arc time t from opening of the switches 2, 3, and 4 of the breaker 1 at time T1 until current interruption at time T2, a change in the magnetic flux is the same as the change in the steady magnetic flux. The magnetic flux after the current interruption (time T2) is attenuated ($\Delta\Phi$) from a magnetic flux value $\Phi 0$ at the time of the current interruption (time T2) (hereinafter referred to as "magnetic flux value at the time of current interruption") because of a characteristic of a core material of the transformer 30 and charging and discharging of energy due to the phase to ground capacitance of each phase of the transformer 30, the capacitances between contacts of the switches 2, 3, and 4, and the like. The magnetic flux reaches a fixed residual magnetic flux value $\Phi r$ sooner or later. Such a characteristic is hereinafter referred to as "attenuation characteristic". Accordingly, it is possible to calculate the residual magnetic flux value $\Phi r$ by estimating and obtaining the attenuation characteristic in advance through measurement, analysis, or the like and applying the attenuation characteristic to the magnetic flux value at the time of current interruption $\Phi 0$.

Thereafter, at a time of the next turn-on, the switches 2, 3, and 4 of the breaker 1 is controlled to be turned on at time T3 when the power supply voltage is in a power supply voltage phase ($\Theta 1$ or $\Theta 2$; in the example shown in FIG. 2, the power supply voltage phase $\Theta 2$) where the residual magnetic flux $\Phi r$ and a theoretical value of the steady magnetic flux match. If the switches 2, 3, and 4 are controlled in this way, a transient phenomenon of a magnetic flux at the time of turn-on does not occur and magnetic saturation of the transformer core does not occur. Therefore, an excitation inrush current does not flow.

Figure 3:
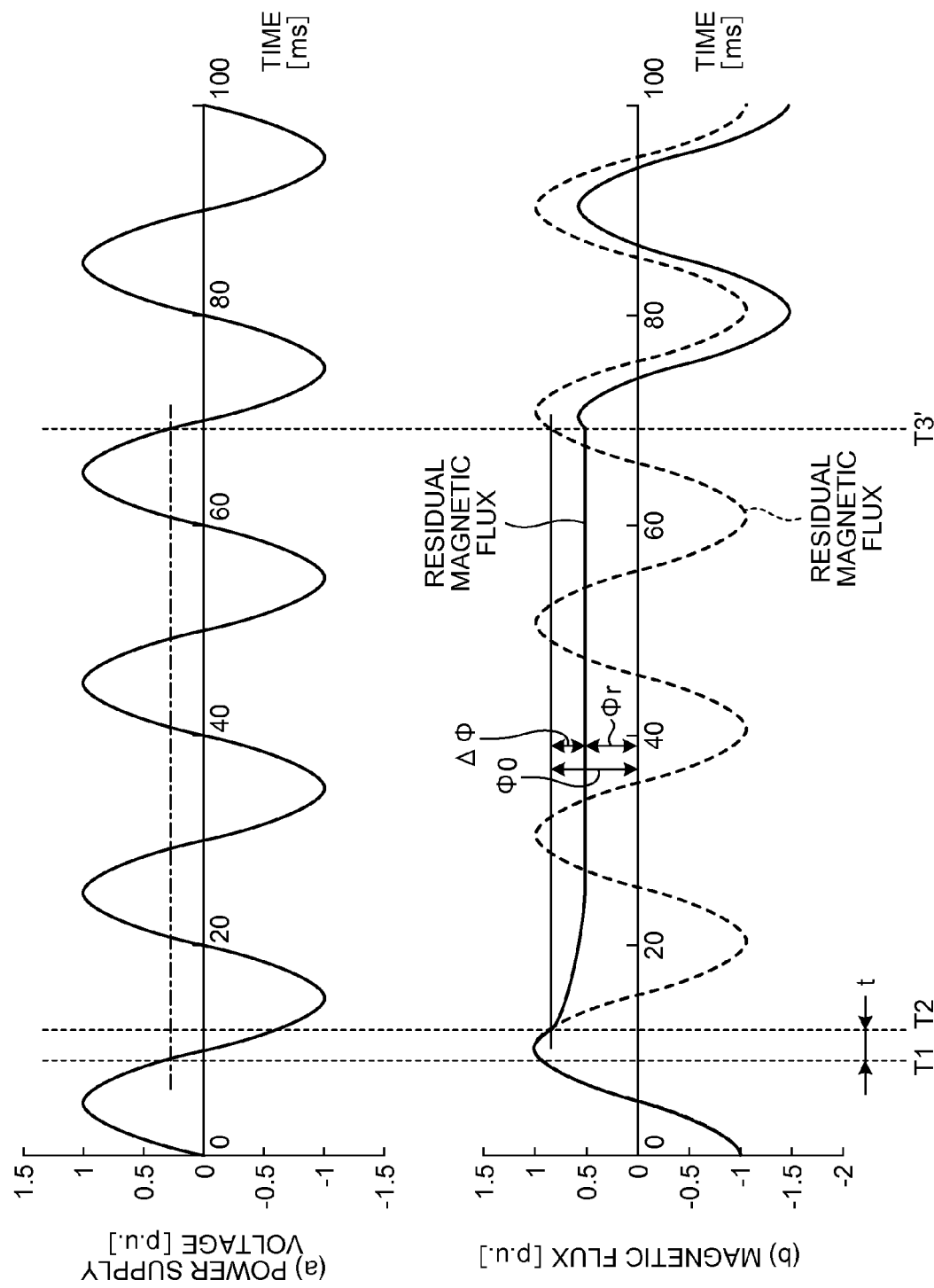
FIG. 3 is a diagram of an example of turn-on in a power supply voltage phase same as a power supply voltage phase during breaker opening compared with the closing phase control according to the first embodiment.

FIG. 3 is a diagram of an example of turn-on in a power supply voltage phase same as a power supply voltage phase at the time of breaker opening compared with the closing phase control according to the first embodiment. FIG. 3(a) shows a power supply voltage waveform equivalent to one phase normalized with a maximum of a power supply voltage set to 1. FIG. 3(b) shows a magnetic flux waveform of a phase corresponding to FIG. 3(a) normalized with a maximum of a magnetic flux set to 1. A waveform indicated by a broken line in FIG. 3(b) indicates a theoretical value waveform of a steady magnetic flux at the time of application of the power supply voltage.

In the example shown in FIG. 3, the switches 2, 3, and 4 of the breaker 1 are turned on in a power supply voltage phase same as a power supply voltage phase at the time of the breaker opening (T1) without taking into account attenuation of a residual magnetic flux after the current interruption (T2) (time T3'). Therefore, a magnetic flux after the turn-on and a steady magnetic flux do not match, a transient phenomenon of the magnetic flux occurs, magnetic saturation of the transformer core occurs, and an excitation inrush current corresponding to the magnitude of the magnetic saturation flows.

The operation of the inrush current suppressing device 50 and a residual magnetic flux value calculating method according to the first embodiment are explained with reference to FIGS. 1 and 2.

When the opening command signal 20 is input, the control unit 53 controls to open the switches 2, 3, and 4 of the breaker 1. The contacts of the switches 2, 3, and 4 are opened at time T1 in the figure after the elapse of the opening time and are interrupted at time T2 after the elapse of the arc time t.

The residual-magnetic-flux calculating unit 51 retains an interruption characteristic of the breaker 1 (i.e., a rate of rise of the dielectric strength (RRDS) characteristic in an opening process of the breaker 1) in advance. The residual-magnetic-flux calculating unit 51 calculates the arc time t based on the interruption characteristic to calculate the interruption time T2 and calculates a power supply voltage phase at the interruption time T2. The interruption characteristic of the breaker 1 can be estimated and obtained by measurement, analysis, or the like beforehand.

Subsequently, the residual-magnetic-flux calculating unit 51 calculates the magnetic flux value at the time of current interruption $\Phi 0$ in the power supply voltage phase at the interruption time T2 and calculates the residual magnetic flux value $\Phi r$ from the magnetic flux value at the time of current interruption $\Phi 0$ according to, for example, a residual magnetic flux calculation formula indicated by the following Expression (1):

$$\Phi r = (1-k)\Phi 0 \qquad (1)$$

In Expression (1), k indicates an attenuation coefficient of a magnetic flux. The attenuation coefficient k is a value depending on a characteristic of a core material of the transformer 30, the phase to ground capacitance of each phase of the transformer 30, the capacitances between contacts of the switches 2, 3, and 4, and the like. The attenuation coefficient k can be arbitrarily set within a range of 0<k<1. In other words, the residual-magnetic-flux calculating unit 51 according to the first embodiment retains the attenuation coefficient k as the attenuation characteristic, and calculates a residual magnetic flux value according to the residual magnetic flux calculation formula indicated by Expression (1). During actual operation, a value estimated and obtained by measurement, analysis, or the like beforehand is set as the attenuation coefficient k.

The turn-on-phase calculating unit 52 calculates the power supply voltage phase ($\Theta 1$, $\Theta 2$) in which the residual magnetic flux value $\Phi r$ and the theoretical value waveform of the steady magnetic flux match, sets the power supply voltage phase as a turn-on power supply voltage phase, and outputs the turn-on power supply voltage phase to the control unit 53.

When the closing command signal 25 is input, the control unit 53 controls to close the switches 2, 3, and 4 of the breaker 1 at time T3 when the power supply voltage is in the turn-on power supply voltage phase (the power supply voltage phase $\Theta 1$ or $\Theta 2$) input from the turn-on-phase calculating unit 52.

As explained above, the inrush current suppressing device according to the first embodiment retains the interruption characteristic in the opening process of the breaker and the attenuation coefficient of the magnetic flux estimated by measurement, analysis, or the like beforehand, applies the attenuation coefficient to the magnetic flux value at the time of current interruption obtained based on the interruption characteristic of the breaker to calculate the residual magnetic flux value, and turns on the breaker in the power supply phase where the calculated residual magnetic flux value and the theoretical value of the steady magnetic flux match. Therefore, it is possible to suppress an excitation inrush current that could occur because of mismatch of the residual magnetic flux and the steady magnetic flux.

Second Embodiment

In the first embodiment, the attenuation coefficient is applied to the magnetic flux value during current interruption to calculate the residual magnetic flux value. However, in this embodiment, in an example explained below, a magnetic flux value conversion table in which magnetic flux values at the time of current interruption and residual magnetic flux values are related is retained, and a residual magnetic flux value corresponding to a magnetic flux value at the time of current interruption is read from the magnetic flux value conversion table. Components of an inrush current suppressing device according to the second embodiment are the same as the components shown in FIG. 1 explained in the first embodiment. Therefore, explanation of the components is omitted. The operations of the components other than the residual-magnetic-flux calculating unit 51 are the same as the operations in the first embodiment. Therefore, explanation of the operations is omitted.

FIG. 4 is a diagram of an example of the magnetic flux value conversion table according to the second embodiment. The residual-magnetic-flux calculating unit 51 in the second embodiment retains, as the attenuation characteristic explained in the first embodiment, for example, a magnetic flux value conversion table shown in FIG. 4 instead of the attenuation coefficient k and the residual magnetic flux calculation formula. In the example shown in FIG. 4, magnetic flux value ratios at the time of current interruption to a maximum of a magnetic flux and residual magnetic flux value ratios to the maximum of the magnetic flux are tabulated.

The operation of the residual-magnetic-flux calculating unit 51 and a residual magnetic flux value calculating method in the second embodiment are explained with reference to FIGS. 1, 2, and 4. As in the first embodiment, the residual-magnetic-flux calculating unit 51 according to the second embodiment retains an interruption characteristic of the breaker 1 in advance. The residual-magnetic-flux calculating unit 51 calculates the arc time t based on the interruption characteristic to calculate the interruption time T2, and calculates a power supply voltage phase at the interruption time T2.

Then, the residual-magnetic-flux calculating unit 51 calculates the magnetic flux value at the time of current interruption $\Phi 0$ in the power supply voltage phase at the interruption time T2, calculates a ratio of the magnetic flux value during current interruption $\Phi 0$ to a maximum of a magnetic flux. The residual-magnetic-flux calculating unit 51 reads, referring to the magnetic flux value conversion table shown in FIG. 4, a ratio of the residual magnetic flux value $\Phi r$ corresponding to the ratio of the magnetic flux value at the time of current interruption $\Phi 0$ to the maximum of the magnetic flux, and calculates the residual magnetic flux value $\Phi r$. Like the attenuation coefficient k explained in the first embodiment, the magnetic flux value conversion table can be estimated and obtained by measurement, analysis, or the like in advance.

As explained above, as in the first embodiment, the inrush current suppressing device according to the second embodiment retains the interruption characteristic in the opening process of the breaker and the magnetic flux value conversion table, in which the magnetic flux values at the time of current interruption and the residual magnetic flux values are related, estimated by measurement, analysis, or the like beforehand. The inrush current suppressing device calculates, from the magnetic flux value conversion table, the residual magnetic flux value corresponding to the magnetic flux value at the time of current interruption obtained based on the interruption characteristic of the breaker. Further, the inrush current suppressing device turns on the breaker in the power supply phase where the calculated residual magnetic flux value and the theoretical value of the steady magnetic flux match. Therefore, as in the first embodiment, it is possible to suppress an excitation inrush current that could occur because of mismatch of the residual magnetic flux and the steady magnetic flux.

In the embodiments, the operation examples in any one phase are explained. However, the residual magnetic flux value calculating methods for calculating a magnetic flux value taking into account the attenuation of the magnetic flux after the current interruption explained in the embodiments can be applied when the three phases are simultaneously turned on and when the phases are individually turned on.

The configurations explained in the embodiments are examples of the configuration of the present invention. It goes without saying that the configurations can be combined with other publicly-known technologies and can be changed by, for example, omitting a part of the configurations without departing from the spirit of the present invention.

INDUSTRIAL APPLICABILITY

As explained above, the inrush current suppressing device according to the present invention is useful as an invention capable of suppressing an excitation inrush current that could occur because of mismatch of a residual magnetic flux and a steady magnetic flux.

REFERENCE SIGNS LIST 1 breaker
2 to 4 switches
20 opening command signal
25 closing command signal
30 transformer
31 three-phase primary winding wire
32 three-phase secondary winding wire
50 inrush current suppressing device
51 residual-magnetic-flux calculating unit
52 turn-on-phase calculating unit
53 control unit
54 power-supply-voltage measuring unit
60 power-supply-voltage detecting unit

The invention claimed is:

1. An inrush current suppressing device applied to a configuration in which a breaker is connected between a power supply and a transformer, the inrush current suppressing device suppressing an excitation inrush current in the transformer associated with a closing operation, the inrush current suppressing device comprising:
a power-supply-voltage measuring unit configured to measure a power supply voltage on a side of the power supply of the breaker;
a residual-magnetic-flux calculating unit configured to retain an interruption characteristic in an opening process of the breaker and an attenuation characteristic of a magnetic flux of the transformer after current interruption, calculate a magnetic flux value at a time of current interruption based on the power supply voltage and the interruption characteristic, and calculate a residual magnetic flux value based on the magnetic flux value at the time of current interruption and the attenuation characteristic;
a turn-on-phase calculating unit configured to calculate a power supply voltage phase where the residual magnetic flux value and a steady magnetic flux value at a time of application of the power supply voltage match and set the power supply voltage phase as a turn-on power supply voltage phase; and
a control unit configured to control closing of the breaker such that the breaker is turned on in the turn-on power supply voltage phase.

2. The inrush current suppressing device according to claim 1, wherein the residual-magnetic-flux calculating unit retains, as the attenuation characteristic, an attenuation coefficient applied to the magnetic flux value at the time of current interruption, and calculates the residual magnetic flux value according to a residual magnetic flux calculation formula for applying the attenuation coefficient to the magnetic flux value at the time of current interruption.

3. The inrush current suppressing device according to claim 1, wherein the residual-magnetic-flux calculating unit retains, as the attenuation characteristic, a magnetic flux value conversion table in which the magnetic flux value at the time of current interruption and the residual magnetic flux value are related, and reads and obtains the residual magnetic flux value corresponding to the magnetic flux value at the time of current interruption from the magnetic flux value conversion table.

4. The inrush current suppressing device according to claim 1, wherein the residual-magnetic-flux calculating unit retains the attenuation characteristic obtained by measurement in a configuration including the power supply, the breaker, and the transformer to which the inrush current suppressing device is applied.

5. The inrush current suppressing device according to claim 1, wherein the residual-magnetic-flux calculating unit retains the attenuation characteristic estimated from an analysis result in a configuration including the power supply, the breaker, and the transformer to which the inrush current suppressing device is applied.

* * * * *